United States Patent [19]

Kent

[11] Patent Number: 5,263,809
[45] Date of Patent: Nov. 23, 1993

[54] MATERIAL HANDLING APPARATUS WITH MULTI-DIRECTIONAL ANCHORING

[75] Inventor: Steven R. Kent, Downey, Calif.

[73] Assignee: Rockwell International Corporation, Seal Beach, Calif.

[21] Appl. No.: 767,608

[22] Filed: Sep. 30, 1991

[51] Int. Cl.⁵ .............................. B66C 23/78
[52] U.S. Cl. .................... 414/680; 212/189; 280/765.1; 901/1; 172/25
[58] Field of Search .......... 414/680, 729; 901/1; 212/189; 52/157; 254/DIG. 1; 172/25, 111; 280/765.1, 766.1, 763.1

[56] References Cited

U.S. PATENT DOCUMENTS

| | | | |
|---|---|---|---|
| 2,251,013 | 7/1929 | Denley et al. | 52/157 X |
| 2,677,474 | 5/1954 | Long et al. | 414/320 X |
| 3,797,283 | 3/1974 | Honer | 52/157 X |
| 4,621,562 | 11/1986 | Carr et al. | 414/729 X |
| 4,981,000 | 1/1991 | Hamilton et al. | 52/157 |

FOREIGN PATENT DOCUMENTS 23735 11/1918 Denmark ................ 52/157

Primary Examiner—Michael S. Huppert
Assistant Examiner—Donald W. Underwood
Attorney, Agent, or Firm—Lawrence N. Ginsberg; Charles T. Silberberg

[57] ABSTRACT

A material handling apparatus comprises a chassis, an anchoring mechanism retained in the chassis and a material handling mechanism secured to the chassis. The anchoring mechanism provides multi-directional anchoring of the chassis onto a penetrable surface upon which the apparatus rests. The anchoring mechanism comprises a pair of counter-rotating shafts whose lower ends comprise left and right-hand helical augers, respectfully. The upper ends of the shafts are drivingly connected to a means of rotation. The material handling mechanism pulls, pushes or lifts the material being handled. The anchoring mechanism is so retained in the chassis to react the operating forces of the material handling apparatus. Use of this multi-directional anchoring mechanism obviates the requirement for massive, traction based devices, which presently perform large material handling tasks.

16 Claims, 4 Drawing Sheets

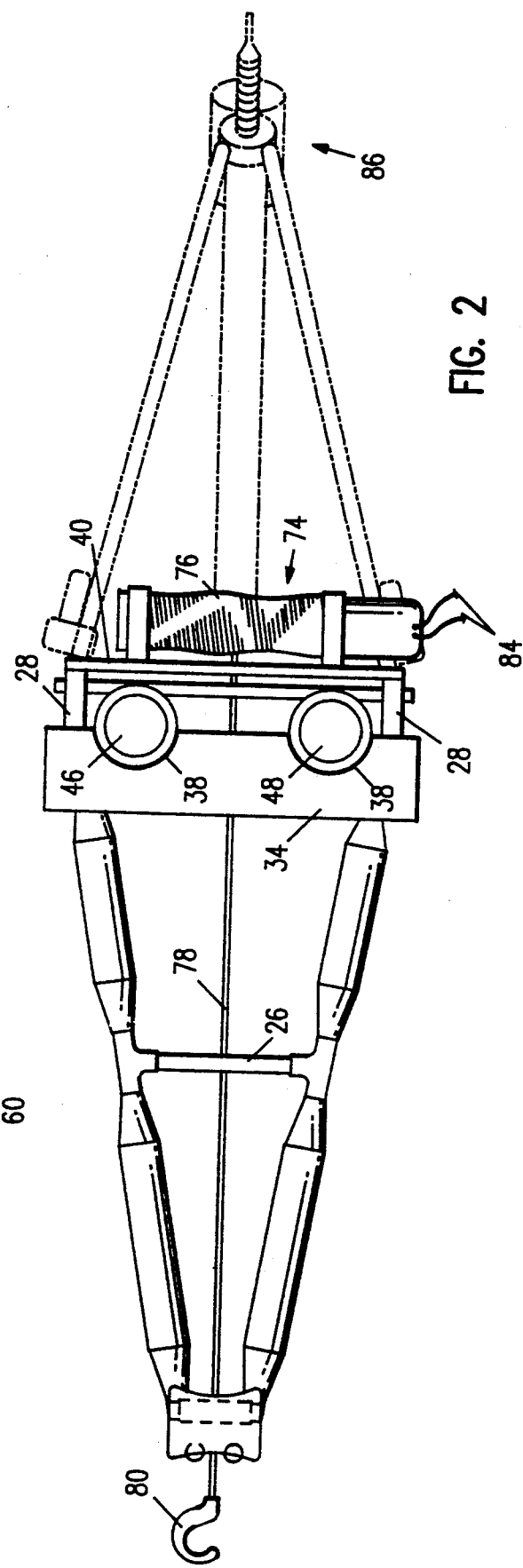

MATERIAL HANDLING APPARATUS WITH MULTI-DIRECTIONAL ANCHORING

BACKGROUND OF THE INVENTION

1. Field of the Invention

The present invention relates generally to pulling, pushing, or lifting of materials, including objects, on penetrable terrain and more particularly to an apparatus which uses multi-directional anchoring to react the forces generated in performing various material handling tasks.

2. Description of the Related Art

The present invention is directed to providing a more efficient alternative to tractor-type vehicles. Vehicles of this type pull or push work-performing implements or objects, by developing high tractive forces through friction with the surface of the ground on which they operate. The total pulling or pushing force generated by a tractor is most dependent upon, and proportional to, the weight of the vehicle. An upper bound for pulling or pushing ability is usually taken to be equal to the weight of the vehicle. For requirements in the range of tens of thousands of pounds, the required tractor is large, expensive, and in need of frequent maintenance and a skilled operator.

Caterpillar Tractor Co. Model Nos. 528 and 508 relate to "skidders" which are vehicles which handle material through the use of a vehicle mounted winch. The weight of these vehicles and their frictional effect with the ground, through contact patches of their wheels, determines the maximum pulling force available. U.S. Pat. No. 4,093,034, issued to Curley et al., assigned to Caterpillar Tractor Co., entitled "Vehicle Supported Winch" discloses a winch system applicable to the above-identified model numbers.

U.S. Pat. No. 3,613,816 issued to W. Gutbrod, entitled "Self-Propelled Multipurpose Vehicle" discloses a utility vehicle of the two-axle type which is designed to fulfill general and cross country transportation requirements and which may include towing or hoisting operations. The power take-off accessory or, capability of the vehicle can be used as a built on or hung on work performing accessory. The '816 device uses a system of belts, clutches and gears which constitute the power take-off facility. Likewise, the hoisting facility, built onto the vehicle is provided by a separate series of clutches and gears.

U.S. Pat. No. 4,202,453, issued to Wilkes Jr. et al, entitled "Articulated Mine Service Vehicle", discloses a hydraulic powered vehicle which performs lifting tasks by means of a winch and boom crane mounted to the vehicle. The vehicle's primary purpose is to lift and carry extremely heavy loads. Like other utility vehicles, this device is dependent upon its own weight to provide the friction necessary for proper operation as a tractor.

OBJECTS AND SUMMARY OF THE INVENTION

It is a principal object of the present invention to pull, push or lift materials, including objects, in a manner that does not rely on the frictional characteristics between the equipment and the surface on which equipment operates.

It is another object of the present invention to reduce the amount of hardware required to do heavy pulling, pushing and/or or hoisting tasks.

Yet another object of the present invention is to provide a means of anchoring a material handling apparatus to a penetrable surface for reacting the pulling, pushing or lifting forces.

Still another object is to provide a system for handling and transporting material relative to a penetrable surface.

Still another object of the present invention is to provide an efficient extraterrestrial material handling and transporting vehicle for construction and mining applications in low gravity environments.

These and other objects are achieved by the present invention which, in its broadest aspects, comprises a chassis, anchoring means retained in the chassis and material handling means secured to the chassis. The anchoring means provides multi-directional anchoring of the chassis onto a penetrable surface upon which the apparatus rests. The anchoring means comprises a pair of counter-rotating shafts whose lower ends comprise left and right-hand helical augers, respectfully. The upper ends of the shafts are drivingly connected to a means of rotation. The material handling means pulls, pushes or lifts the material being handled. The anchoring means is so retained in the chassis to react the operating forces of the material handling apparatus.

Use of this multi-directional anchoring mechanism obviates the requirement for massive, traction based devices, which presently perform large material handling tasks.

The present invention is distinguished from the winch systems disclosed by Caterpillar Tractor Company. It provides a more secure, active means of anchoring and generating a high winching capability (by use of the anchoring mechanism) rather than relying on mere friction effects produced by wheel contact patches.

The term "penetrable" as used herein refers broadly to any surface in which helical augers may penetrate. Thus, for example, a penetrable surface may include natural terrain on earth, the lunar surface or other extraterrestrial surfaces.

Other objects, advantages and novel features of the present invention will become apparent from the following detailed description of the invention when considered in conjunction with the accompanying drawings.

BRIEF DESCRIPTION OF THE DRAWINGS

FIG. 2 is a top plan view of the FIG. 1 apparatus, taken along line 2—2 of FIG. 1.

FIG. 3 is a top plan view of the counter-rotating mechanism of the shafts, taken along line 3—3 of FIG. 1.

The same elements or parts throughout the figures are designated by the same reference characters.

DETAILED DESCRIPTION OF THE PREFERRED EMBODIMENTS

Figure 1:
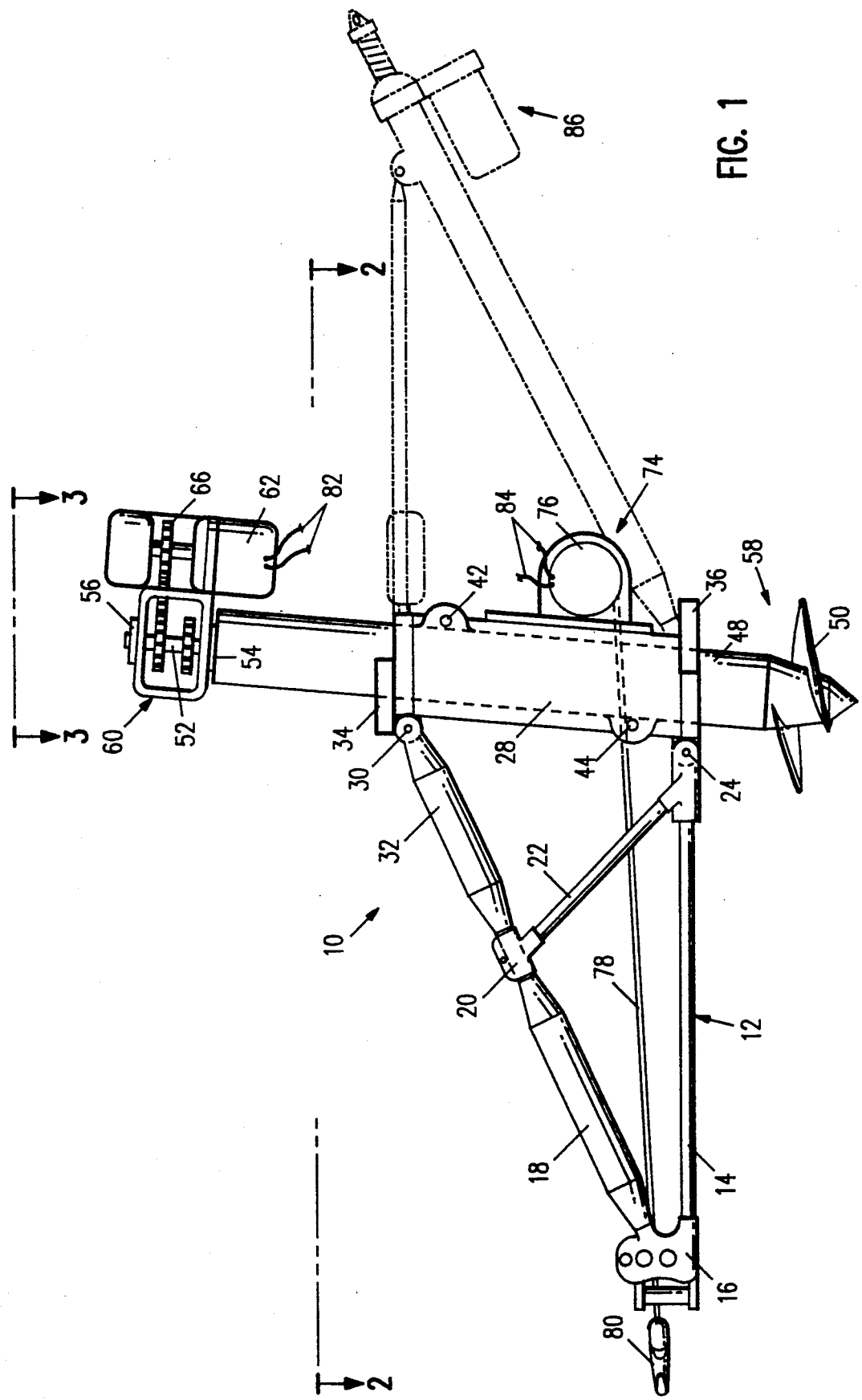
FIG. 1 is a side elevation view of the material handling apparatus of the present invention.

Referring to the drawings and the characters of reference marked thereon, the material handling apparatus of the present invention is designated generally as 10 in FIG. 1. The apparatus 10 may be placed on a vehicle (as will be described below) or may be manufactured in either sufficiently small size or/and weight to be hand carried. A chassis, designated generally as 12, retains the operating portion of the apparatus and reacts to forces generated during operation of the apparatus 10. (The chassis 12 illustrated in FIG. 1 may be disassembled for ease of stowage. Or, if preferred, the chassis may be constructed as a unitary structure.) Chassis 12 includes a triangular framework of tubular elements. Lower, triangular elements 14 connect to a fairlead assembly 16 at a forward end of the tubular framework. Upper diagonal tubular elements 18 also connect to this fairlead assembly 16. The rear end of the tubular elements 18 are connected to fixed joints 20. Each diagonal stabilizing element 22 is supported between a fixed joint 20 and a pin joint 24 at the rear of the tubular element 14. As can be seen in FIG. 2, the fixed joints 20 are connected by a lateral tubular element 26.

At the rear end of the chassis 12, are side plates 28 which attach at their lower ends, to the lower pin joints 24 and, at their upper ends, to upper pin joints 30. Upper pin joints 30 attach to the end of rear, upper diagonal tubular elements 32. An upper cradle 34 is connected at the upper end of the side plates 28 and a lower cradle 36 is connected at the lower end of the side plates 28. Upper cradle 34 and lower cradle 36 have semi-circular cutout portions 38 (see FIG. 2) for maintaining the position of the rotating shafts and for transmitting the forces induced by these large diameter shaft, as will be discussed below. Both the upper and lower cradles 34, 36 have similar cutouts. The two side plates 28 are connected by an end plate 40. Upper shaft retainer 42 and lower shaft retainer 44 hold the shafts in the cutouts 38.

As noted, two large diameter shafts 46, 48 are retained by the cutouts 38 in the cradles 34, 36. The shafts 46, 48 are free to move vertically within their respective cradles so as to submerge or retract the shafts into or out of the penetrable surface in which the apparatus is operating. The lower ends of the pair of shafts 46, 48 include left and right-hand helical augers 50, respectively. The upper ends of shafts 46, 48 each transition to a narrow diameter 52 which rests in upper and lower bearings 54, 56.

In addition to the shafts, the anchoring means, designated generally as 58, for providing multi-directional anchoring of the chassis 12, includes a mechanism for providing high torque, counter-rotating motion to the shafts. Referring now to FIG. 3, this high torque counter-rotating mechanism comprises a rectangular box structure 60, gear motor 62, and chain drive assembly designated generally as 64. This counter-rotating mechanism includes upper and lower shaft bearings 56, 54, as identified previously. The required counter-rotating motion of the shafts is created by the gear motor 62 which operates a system of chains and sprockets. A drive sprocket 66 on the gear motor 62 drives a small sprocket 68 (via chain 69) on one of the shafts. Another small sprocket is driven on the same chain on lay shaft 70 to reverse the direction of rotation for the opposite large shaft 48 via chain 72.

The material handling means, designated generally as 74, is secured to the chassis 12 for pulling material to be handled. Material handling means 74 includes a winch assembly 76. Winch assembly 76 includes a cable 78 and a hook 80. Winch assembly 76 is bolted to the end plate 40.

Power control of gear motor 62 is provided by electric leads 82. Power and control of winch assembly 76 is provided by electric leads 84. The winch assembly and/or gear motor may be operated by electric, hydraulic or pneumatic means.

During operation the user places the device on the surface of the ground. The user operates gear motor 62 with a switch on his controller to operate the gear motor 62 and counter-rotating drive mechanism, the helical augers 50 of the shafts being in contact with the surface of the ground. The augers 50 pull their respective anchor shafts into the ground. The user deactivates the gear motor 62 when the auger shafts have submerged to their maximum depth.

At this point, the mechanism is anchored to the surface of the ground and the user takes the cable hook from the winch assembly 76 and attaches it to the material to be moved. The user then activates the switch for the winch assembly 76 and the material is drawn toward the material handling device, horizontally along the surface of the ground. When the desired movement of the material is achieved, the user stops the winch action, activates the gear motor 62 in reverse for the anchor shaft counter-rotation and the helical ends of the anchor shafts push the anchor shafts upward out of the ground.

When the helical augers 50 have reached the surface of the ground, the device is ready to be relocated in a different position if the material is to be moved another distance. Once the device is relocated, the entire operation is repeated a number of times sufficient to move the material from its initial position to its desired position.

Instead of, or in addition to, the winch assembly 76, a jack screw assembly or hydraulic cylinder may be used to provide a means for pushing or pulling material to be handled. Such a jack screw assembly is illustrated in phantom as general numeral designation 86. During the operation of the material handling device, using the jack screw assembly for pushing and pulling, the operator would position the apparatus 10 on the surface of the ground and anchor the apparatus using the gear motor switch to lower the anchor shafts, as was described previously. The horizontal tubular elements on the jack screw assembly 86 are adjustable and are used to position the end of the jack screw. The end of the jack screw assembly consists of a fitting which is accommodated by a corresponding receptable on the material or object to be pulled or pushed. After the horizontal positioning elements have been fixed at a position at which the receptacle and fitting on the material to be moved are coincident, and the device is securely anchored to the surface of the ground, a switch for the jack screw assembly gear motor is activated and the material to be moved is either pushed or pulled.

Figure 5:
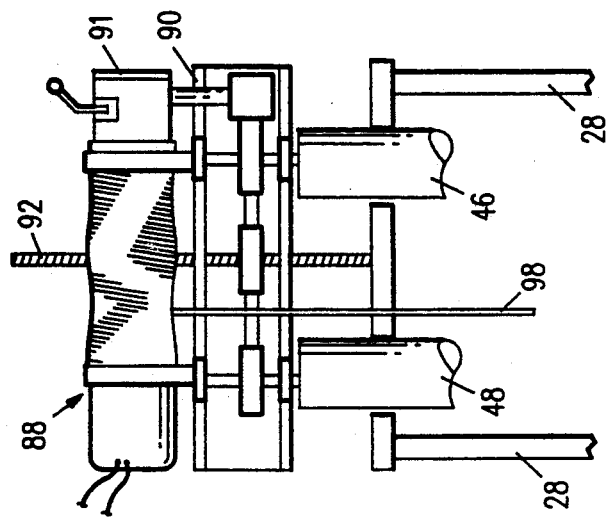
FIG. 5 is an end view of the FIG. 4 embodiment, taken along line 5—5 of FIG. 4.
Figure 4:
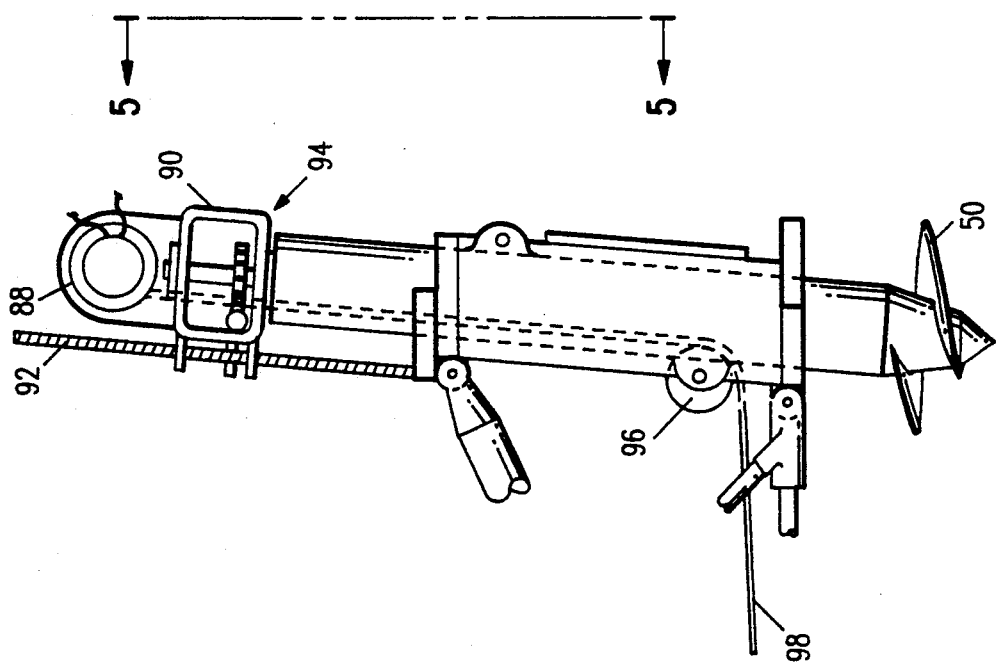
FIG. 4 is a side elevation view of an alternate embodiment of the material handling apparatus, illustrating a dual function motor for alternatively operating the anchoring means and the material handling means of the present invention.

An alternate embodiment of the device consists of a combined winch assembly and counter-rotation gear motor unit, which can be alternatively selected using a selector on the unit. FIGS. 4 and 5 illustrate such an alternate arrangement. Referring now to these figures the winch assembly 88 is located above the shaft bearing holder 90. The winch assembly 88 has a dual mode selector mechanism, 91, which allows it to function as either a winch or as the gear motor to counter-rotate the shafts. The shaft rotation mechanism includes the rotation of a jack screw 92 which aids in raising and lowering the anchoring means 94. Pulley 96 changes the direction of winch cable 98 from horizontal to vertical, since in the alternative embodiment, winch 88 resides atop the apparatus.

The present invention was developed to perform extraterrestrial construction and mining tasks, particularly for the lunar surface. For such tasks on the lunar surface where the gravitational pull is only approximately 1/6 that of the earth, use of conventional pushing, pulling and lifting techniques are problematic because these tasks are normally dependent on the ability to generate traction relative to the surface on which the equipment is resting. By supplying a more secure means of anchoring to the surface, more effective construction and mining equipment is attained.

Figure 6:
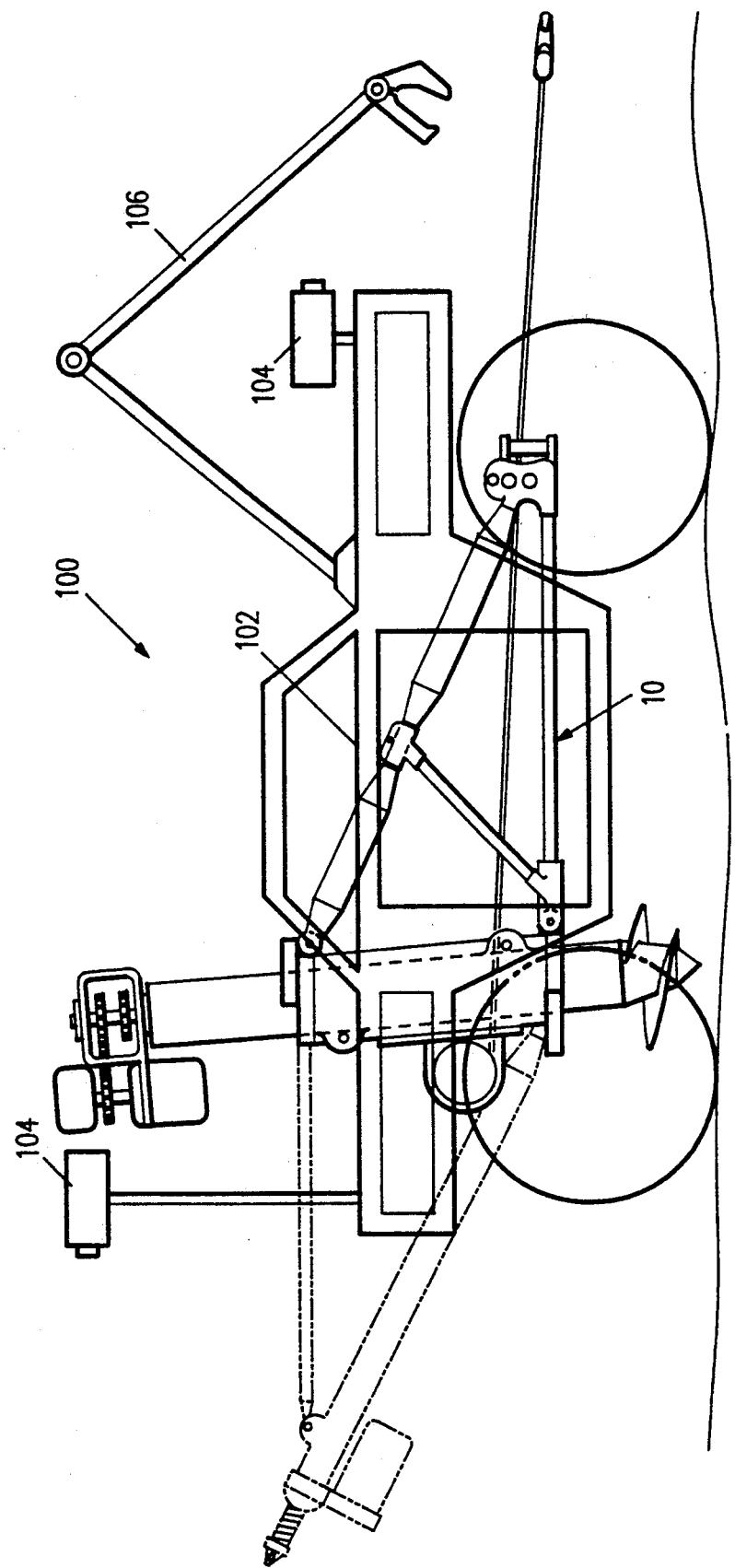
FIG. 6 is a side elevation view of the material handling apparatus mounted on a vehicle to form a system for handling and transporting material.

Referring now to FIG. 6, it can be seen that the apparatus 10 can be readily adapted to an extraterrestrial construction and mining vehicle, designated generally as 100. Vehicle 100 comprises a vehicle chassis 102 from which material handling apparatus 10 may be suspended and lowered to the extraterrestrial surface. Alternatively, apparatus 10 can be built into the vehicle and the vehicle's wheels can be retracted to lower the apparatus to the ground. The vehicle nominally consists of four driven and steered wheels to provide the required mobility. Robotic control of the vehicle 100 is accomplished through the use a video camera system 104 and associated communication link (not shown). The attachment and detachment of material handled by vehicle 100 is assisted by a remotely controlled arm 106.

During the operation of material handling system on the vehicle for a pulling application, the user, located at a remote site, would maneuver the vehicle using the camera system to a point where the material to be handled is within reach of manipulator arm 106. Arm 106 would be used to place the hook of the material handling apparatus 10 on the material to be moved. The user would then maneuver the vehicle away from the material to be handled a distance compatible with the length of the cable or the terrain between the two objects. When the proper distance is achieved, the operator would stop the vehicle 100 and lower the material handling apparatus 10 to the surface of the ground and use his control to operate the gear motor on the anchoring shaft to submerge the anchor shafts into the ground to their maximum depth. Once the vehicle is properly anchored, the user would switch to the winch operation and draw the material to be handled to the vehicle using the winch and cable. When that sequence is finished, the user would retract the anchoring system by operating the gear motor in reverse he would then raise the material handling device off the surface to provide ground clearance and he would advance vehicle 100 to a new location to reset the anchor. This process would be repeated until the material was moved the required distance.

During the operation of vehicle 100 in a pushing or lifting mode, the operator would, again, maneuver the vehicle using the remote camera system, to the proper proximity with the object to be moved. In this operation, however, the operator would be using the jack screw assembly located on the front of the vehicle and would position the jack screw in the retracted position at the proper distance away from the object to be pushed or lifted. From this position, the user would lower the material handling device 10 to the surface and again submerge the anchoring device to its maximum depth. From this configuration, the operator would operate the jack screw assembly to either push or pull the object to be moved to its new location. Once the desired position is achieved, the anchoring system would be retracted, the material handling apparatus would be withdrawn from the surface and the vehicle would be positioned at a new point.

Obviously, many modifications and variations of the present invention are possible in light of the above teachings. It is therefore to be understood that within the scope of the appended claims, the invention may be practiced otherwise than as specifically described.

What is desired and claimed to be secured by Letters Patent of the United States is:

1. A mobile material handling apparatus comprising:
   a) a mobile chassis;
   b) anchoring means retained in said chassis for providing multi-directional anchoring of said chassis onto a penetrable surface upon which the apparatus rests, said anchoring means comprising a pair of counter-rotating shafts whose lower ends comprise left and right-hand helical augers, respectively, and whose upper ends are drivingly connected to a means of rotation; and
   c) material handling means secured to said chassis for manipulating said material being handled, said anchoring means being so retained in said chassis to react to the operating forces of said material handling apparatus whereby the apparatus is held substantially stationary.

2. The apparatus of claim 1 wherein said material handling means, comprises:
   a winch assembly securely attached to said chassis.

3. The apparatus of claim 2 wherein said winch assembly includes an electric winch assembly.

4. The apparatus of claim 2 wherein said winch assembly includes a hydraulic winch assembly.

5. The apparatus of claim 2 wherein said winch assembly includes a pneumatic winch assembly.

6. The apparatus of claim 1 wherein said material handling means comprises:
   a jack screw assembly means securely attached to said chassis to permit material handling by pushing and pulling the material.

7. The apparatus of claim 1 wherein said means of rotation includes dual mode selector for alternatively connecting said counter-rotating shafts of said anchoring means and said material handling means to said means of rotation.

8. A system for handling and transporting material, comprising:
   a) a wheeled vehicle; and
   b) a material handling apparatus carried by said vehicle, comprising:
      a chassis;
      anchoring means retained in said chassis for providing multi-directional anchoring of said chassis onto a penetrable surface upon which said apparatus rests, said anchoring means comprising a pair of counter-rotating shafts whose lower ends comprise left and right-hand helical augers, respectively, and whose upper ends are drivingly connected to a means of rotation; and
      material handling means secured to said chassis for manipulating said material being handled, said anchoring means being so retained in said chassis to react to the operating forces of said material handling means whereby the apparatus is held substantially stationary.

9. The system of claim 8 wherein said vehicle is a self-propelled, comprising an articulated arm cart.

10. The system of claim 9 wherein said vehicle further includes a video camera and communication control system.

11. The system of claim 8 wherein material handling means comprises:
a winch assembly securely attached to said chassis.

12. The system of claim 11 wherein said winch assembly includes an electric winch assembly.

13. The system of claim 11 wherein said winch assembly includes a hydraulic winch assembly.

14. The system of claim 11 wherein said winch assembly includes a pneumatic winch assembly.

15. The system of claim 8 wherein said material handling means comprises:
a jack screw assembly means securely attached to said chassis to permit material handling by pushing and pulling the material.

16. The system of claim 8 wherein said means of rotation includes a dual mode selector for alternatively connecting said counter-rotating shaft of said anchoring means and said material handling means to said means of rotation.

* * * * *